UNITED STATES PATENT OFFICE.

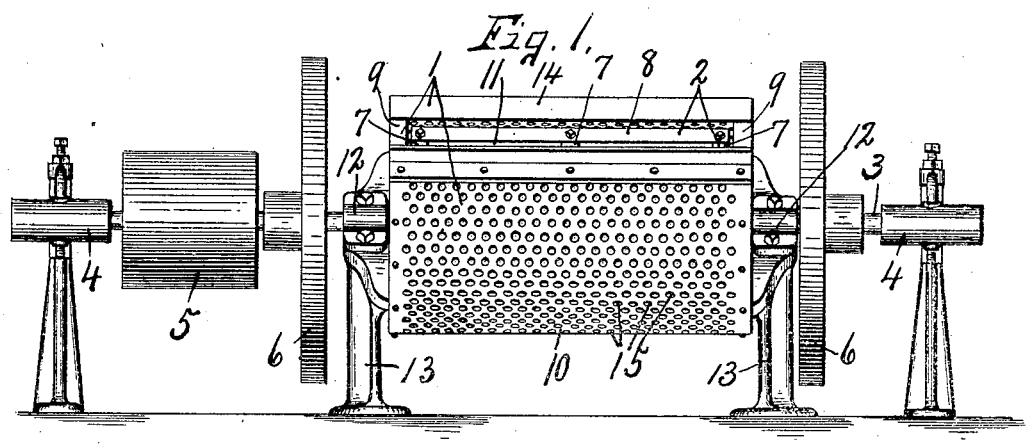
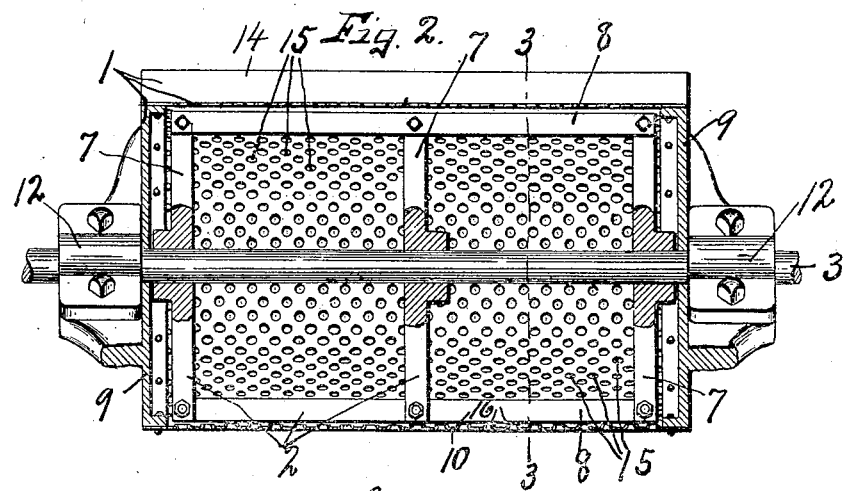
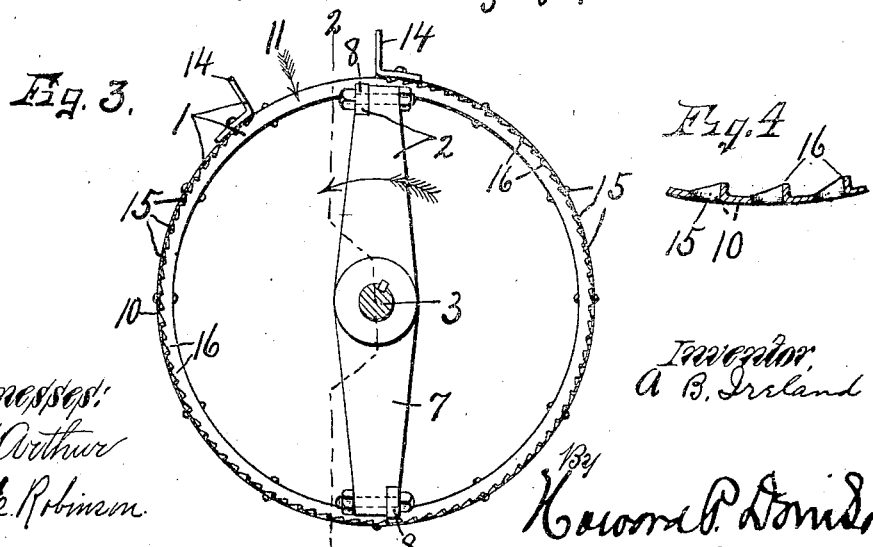

A BERTSELL IRELAND, OF GREENE, NEW YORK.

CASEIN-PICKER.

No. 810,655.　　　Specification of Letters Patent.　　　Patented Jan. 23, 1906.

Application filed July 28, 1904. Serial No. 218,571.

*To all whom it may concern:*

Be it known that I, A BERTSELL IRELAND, of Greene, in the county of Chenango, in the State of New York, have invented new and useful Improvements in Casein-Pickers, of which the following, taken in connection with the accompanying drawings, is a full, clear, and exact description.

This invention relates to machines for picking casein and reducing it to comparatively fine particles, somewhat resembling coarsely-ground corn.

In a copending application I have shown and described a casein-mangling machine in which the curd cakes are partially reduced or broken up into comparatively small bodies or particles; and the object of my present machine is to receive the broken curd after it leaves the mangler and further reduce it to the condition above mentioned. This curd is exceedingly tough and rubber-like, and it is therefore necessary to reduce it little by little and still be able to break it up rapidly into small particles, the maximum size of which is determined by the size of the openings in the screen.

In the drawings, Figure 1 is a front elevation of a casein-picker embodying the elements of my invention. Figs. 2 and 3 are sectional views taken, respectively, on lines 2 2, Fig. 3, and 3 3, Fig. 2. Fig. 4 is an enlarged fragmentary sectional view of a portion of the metal shell, showing the pickers and holes.

This picker comprises, essentially, a fixed screen cylinder or shell 1 and a rotary dasher 2, which is mounted upon and secured to a rotary shaft 3. This shaft extends centrally through the shell 1 and is journaled in suitable bearings 4 and is provided with a driving-pulley 5 and balance-wheels 6 for steadying the action and speed of the dasher. The dasher is inclosed in the shell 1 and consists of a series of spiders or arms 7, which are centrally secured to and project equidistant in diametrically opposite directions from the shaft 3 and are united by parallel bars 8. These bars 8 are secured to the outer ends of the arms 7 equidistant from and parallel with the shaft, and both rotate in substantially the same circular plane, and their outer longitudinal edges travel in close proximity to the inner face of the shell 1. This shell preferably consists of opposite circular end heads 9 and a foraminous sheet-metal shell 10, having a lengthwise opening 11 in its top and extending from end to end between the heads 9. The heads are formed with a central bearing 12, which receive the shaft 3 and rest upon suitable standards 13, whereby the screen is held in a fixed position.

The cylinder 10 is permanently fastened at its ends by suitable means, as rivets, to the peripheries of the heads 9, and at the front and rear edges of the inlet-opening 11 are radially-projecting lengthwise flanges 14, which are also secured to the heads 9 and serve to stiffen and to hold adjacent edges of the screen in place and also affords a convenient mouth or hopper into which the curd or casein may be fed by hand or otherwise. The body of the cylinder is provided with a series of comparatively small holes 15, of uniform size, which are formed by a suitable punch, whereby the stock removed by the formation of each hole is driven or forced inwardly, so that portions of the stock around each hole project inwardly beyond the inner face of the cylinder and form abrupt cutting edges or pickers 16, which coact with the dasher-bars to reduce the curd to comparatively fine particles about the size of coarsely-ground corn. The dasher having the bars 8 is rotated at a high rate of speed, and the outer longitudinal edges of said bars 8 travel closely to the cutting edges of the pickers, so that the curd is thrown centrifugally with great force against the pickers and is finely ground against the same by the bars 8 until the particles are sufficiently fine to pass through the apertures 15 of the cylinder, from which the particles may be collected in any desired manner, not necessary to illustrate or describe.

It is thought that the construction and operation of my improved curd-picker is sufficiently illustrated and described to enable any one skilled in this art to make and use the same.

Having thus described my invention, what I claim, and desire to secure by Letters Patent, is—

A casein-picker comprising a sheet-metal shell having an inlet in one side and having an angle-plate arranged at each edge of said inlet, said shell being provided with a series of holes extending throughout the entire surface of the shell, portions of the stock around each hole being left integral with the shell and pressed inwardly beyond the inner surface of the shell to form pickers, supports for said shell, a shaft journaled in said supports, radial arms carried by said shaft and flat bars connected to the outer ends of said radial arms and forming a dasher.

In witness whereof I have hereunto set my hand this 21st day of July, 1904.

A BERTSELL IRELAND.

Witnesses:
   JOS. E. JULIAND,
   CHAS. W. GRAY.